Jan. 20, 1942. A. DRUCKER 2,270,517
PROJECTION APPARATUS
Filed June 23, 1938
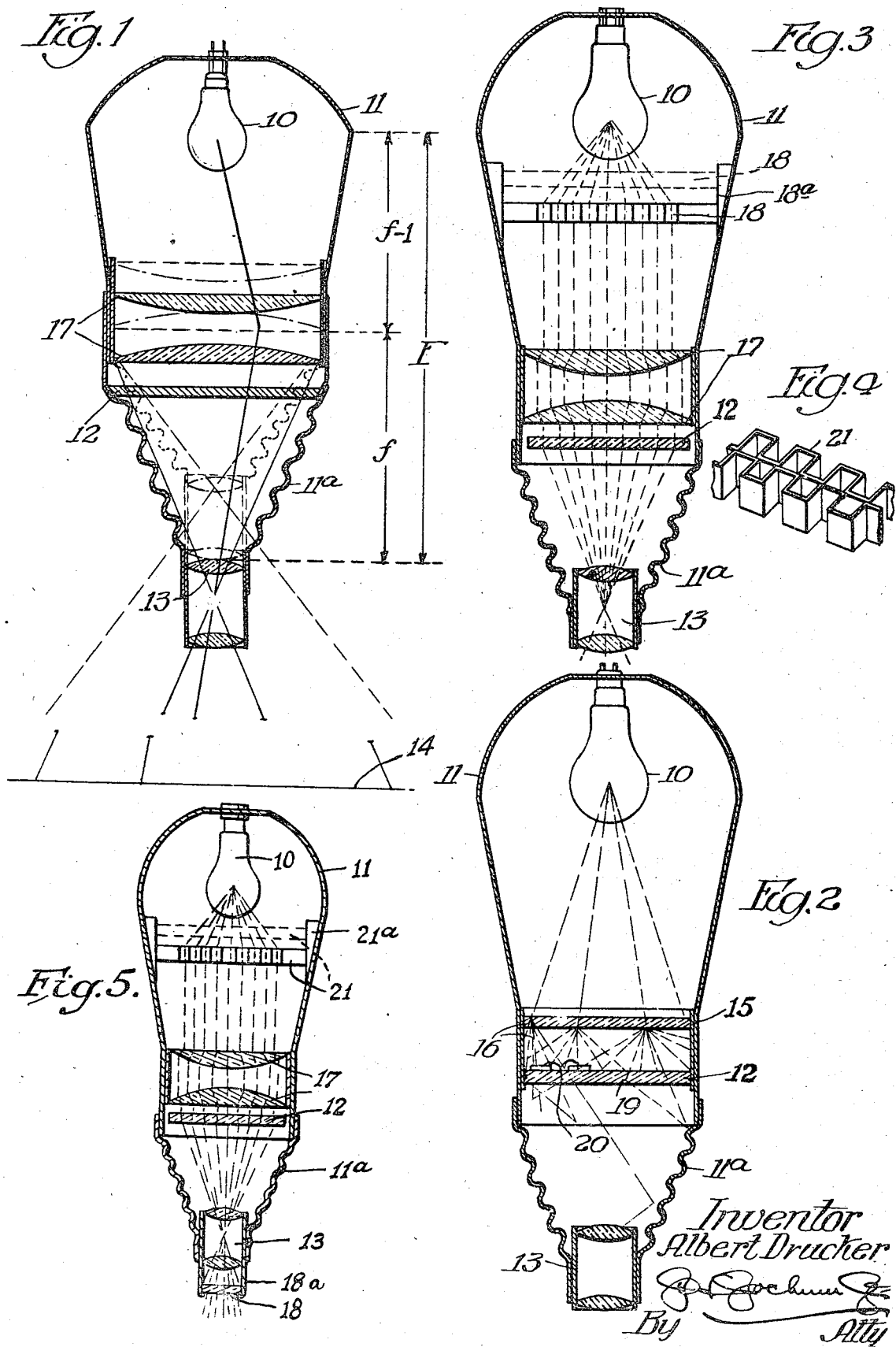
Inventor
Albert Drucker Patented Jan. 20, 1942

2,270,517

UNITED STATES PATENT OFFICE 2,270,517

PROJECTION APPARATUS

Albert Drucker, Chicago, Ill., assignor to Burke & James, Inc., Chicago, Ill., a corporation of Illinois Application June 23, 1938, Serial No. 215,332

3 Claims. (Cl. 88—24)

This invention relates more specifically to improvements in apparatus for projection of transparent images by means of a light source and projection lens, particularly adapted though not necessarily limited to stereopticon projection, enlarging lanterns, direct photograph printing and the like, and one of the objects of the invention is to define and maintain a cone of light, so that in any position of the projection lens, the adjacent portion of the cone of light will be of a diameter that it will fill the entrance aperture of the projection lens.

Another object of the invention is to arrange the light so that the rays are uni-directional or as nearly so as is consistent with good practice. The uni-directional beam of light may be so arranged that instead of consisting of parallel rays, the rays from the elements form a cone of light.

In carrying this invention into operation suitable apparatus is employed such as is shown diagrammatically in the accompanying drawing, and in which drawing Figure 1 diagrammatically represents an improved apparatus showing the relation between the light source, transparency, light collecting condenser, projection lens and projection screen, wherein the condensers are movable or adjustable with respect to the transparency, the dotted lines showing one of the possible adjusted positions.

Figure 2 shows the usual type of projection apparatus without the use of condensers, but with a diffuser medium.

Figure 3 diagrammatically illustrates the value of uni-directional light rays acquired by using a polarizing screen or grill together with condensing lenses.

Figure 4 is a detail perspective view of a portion of a grill type of a light ray directional element.

Figure 5 is a view similar to Figure 3, showing another form of the invention.

It is well known that in the usual projection apparatus there is essentially a source of light, a housing, a transparent image and a projection lens, all suitably mounted and interconnected so that they may be employed either for enlarging, for producing images of the same size, or for reducing images of the transparency.

In the usual type of projection equipment, rays from the source of light 10, within a housing 11 which pass through a transparency 12, are collected by a lens 13, which latter projects the image of the transparency upon a screen 14.

With an apparatus of this type as heretofore employed, it is quite difficult, and in fact almost impossible from a practical standpoint, to entirely diffuse the light rays of the entire surface of the transparency 12, so that they may be collected by the lens 13, and projected evenly upon the screen 14.

In an attempt to collect the rays from the source of light a dispersing medium 15, such as opal glass or ground glass, has been disposed between the source of light 10 and the transparency 12, but even with this arrangement when the light rays from the source of light or lamp strike the dispersing medium, they will be refracted and reflected from all possible angles as shown at 16, in Figure 2, so that a large portion of the light rays will not enter the lens 13, directly, but will enter as a secondary or multiple reflection from the projector housing, bellows 11—A etc., as shown in Figure 2.

To overcome these difficulties and objections is another object of this invention.

As stated, the equipment heretofore available consisted essentially of the light source 10, housing 11, together with a condenser or set of condensers 17, disposed between the light source and the transparency 12.

These condensers serve the purpose of collecting light rays from the lamp and concentrating them into the entrance aperture of the lens 13. For a projection equipment of fixed magnification, such a design and arrangement seems to be satisfactory.

With such an apparatus, however, when changes in the image size is required, it has heretofore been customary and necessary to move the light source 10, with reference to the fixed condensers 17, and transparency 12, so that maximum volume of light rays will fill the entrance aperture of the lens 13, and in going from extreme enlargement to reductions, or even for the same size images, the theoretical and practical distance between the light source 10 and the condensers 17, varies considerably.

It is well known in this art that $$\frac{1}{F} = \frac{1}{f} + \frac{1}{f'}$$

(see Figure 1) where $f$ equals the front focal distance and $f'$ equals the rear focal distance and that the extreme distance F can be made to vary within very wide limits if the $f'$ is maintained as a constant.

In order to eliminate the unnecessarily large equipment such theoretical consideration would require, it is proposed in the present invention to maintain the source of light 10 fixed with relation to the transparency 12, and to alter the front focal distance f and the rear focal distance f' by moving the condensers 17 toward and away from the source of light 10, as indicated in dotted lines in Figure 1.

Under the best, now available, conditions it is impossible to have all of the illumination uni-directional, but by interposing between the light source 10 and the image 14 a polarizing element 18, (see Figures 3 and 5) it is possible and practical to secure illumination in which the light rays are parallel as well as uni-directional; it is well known that some of the light rays passing through clear and opaque areas 19—20 of the transparency 12 will be at least partially obliterated by defraction as shown in Figure 2, opaque area 20 of the transparency, with a constant degrading of contrast and a poor rendering of the transparency being projected, but with the present invention and with the arrangement as shown, these objections are reduced to a minimum.

The polarizing element 18 may be mounted for adjustment in directions toward and away from the light source 10 by means of a support 18—A.

By the use of uni-directional light rays as shown in Figures 3 and 5, either alone or in combination with a condenser system 17, a greatly increased brilliance results and the degrading of a contrast from the transparency is reduced. Instead of a polarizing medium 18, it is possible with the present invention to employ, and some equipment renders it possible to do so, a grill type directional element 21—A, (see Figures 3 and 4) and while such an element is not as efficient, is very effective.

The polarizing medium serves in the same capacity but to a greater extent.

While the preferred forms of the invention have been herein shown and described, it is to be understood that various changes may be made in the details of construction and in the combination and arrangement of the various parts of the apparatus, within the scope of the claims, without departing from the spirit of this invention.

What is claimed as new is:

1. A projection apparatus for projecting images of varying sizes, embodying a housing, a source of light fixed in said housing, the said housing having an opening in its front wall, an extensible and contractable closure for said opening, a projection lens supported at the end of said closure opposite said opening and adjustable longitudinally by the movement of said closure, a transparency disposed between the source of light and said lens and fixed with respect to the source of light, a condenser disposed between the source of light and said transparency, said condenser slidably mounted within said housing for adjustment toward and away from the source of light to fill the entrance aperture of the projection lens with a maximum amount of light rays, thereby compensating varying sizes of images, and a grill type axial directional element disposed between the source of light and the said condenser for straightening the light rays that are passing therethrough from the source of light toward the projection lens.

2. A projection apparatus of the character described embodying a housing, a source of light fixed in said housing, the said housing having an opening in its front wall, an extensible and contractable closure for said opening, a projection lens supported at the end of said closure opposite said opening and adjustable longitudinally by the movement of said closure, a transparency disposed between the source of light and said lens and fixed with respect to the source of light, a condenser disposed between the source of light and said transparency and slidably mounted within said housing for adjustment toward and away from the source of light, a grill type directional element disposed between the source of light and the said condenser for straightening the light rays that are passing therethrough from the source of light toward the condenser, and a polarizing element disposed between the source of light and the projected image.

3. A projection apparatus of the character described embodying a housing, a source of light fixed in said housing, the said housing having an opening in its front wall, an extensible and contractable closure for said opening, a projection lens supported at the end of said closure opposite said opening and adjustable longitudinally by the movement of said closure, a transparency disposed between the source of light and said lens and fixed with respect to the source of light, a condenser disposed between the source of light and said transparency and slidably mounted within said housing for adjustment toward and away from the source of light, a grill type directional element disposed between the source of light and the said condenser for straightening the light rays that are passing therethrough from the source of light toward the condenser, and a polarizing element disposed between the source of light and the projected image, said directional element being mounted for adjustment in directions towards and away from said source of light.

ALBERT DRUCKER.